United States Patent [19]
Matsui et al.

[11] 3,859,482
[45] Jan. 7, 1975

[54] MECHANICAL PRESSURE DETECTING DEVICE

[75] Inventors: Shunji Matsui; Kenzo Hirashima; Yoshikazu Hayakawa; Nagayuki Marumo, all of Yokohama City, Japan

[73] Assignee: Nissan Motor Company Limited, Yokohama City, Japan

[22] Filed: Feb. 24, 1972

[21] Appl. No.: 228,975

[30] Foreign Application Priority Data

| Mar. 4, 1971 | Japan | 46-13483 |
| May 28, 1971 | Japan | 46-44004 |
| July 23, 1971 | Japan | 46-65217 |
| Oct. 5, 1971 | Japan | 46-9157 |
| Oct. 25, 1971 | Japan | 46-98827 |
| July 21, 1971 | Japan | 46-64469 |
| June 24, 1971 | Japan | 46-45837 |
| June 25, 1971 | Japan | 46-46107 |

[52] U.S. Cl. .................. 200/61.08, 340/61
[51] Int. Cl. .......................... H01h 3/00
[58] Field of Search ......... 200/61.08, 61.93, 168 F; 340/61, 262

[56] References Cited
UNITED STATES PATENTS

| 2,105,286 | 1/1938 | Jennings | 200/61.08 |
| 2,414,912 | 1/1947 | Wiatt | 200/61.08 |
| 2,458,464 | 1/1949 | Busacker et al. | 200/61.08 |
| 2,877,324 | 3/1959 | Oshry | 200/159 B |
| 3,003,045 | 10/1961 | Tichenor | 200/168 F X |
| 3,500,463 | 3/1970 | Gregory | 337/297 |
| 3,732,390 | 5/1973 | Novak | 200/159 B X |
| 3,751,613 | 8/1973 | Inose et al. | 200/168 F X |

Primary Examiner—Robert K. Schaefer
Assistant Examiner—William J. Smith

[57] ABSTRACT

A mechanical pressure or collision detecting device is herein proposed, for being advantageously used in combination with a known deceleration detector or an inertia-responsive switch in a vehicular safety arrangement which is adapted to protect a vehicle occupant from incurring an injury in the event of a collision of the motor vehicle. The deceleration detector is adapted to rapidly detecting the collision condition while the mechanical pressure detecting device is adapted to hold the safety arrangement in an inoperative condition if the shocks or collisions encountered by the motor vehicle are of the nature which is unlikely to invite a serious danger to the vehicle occupant. The mechanical pressure detecting device includes electrically conductive, mechanically deformable or rupturable means which may be either kept conducting under a normal condition or rendered conducting only when the collision is encountered by the motor vehicle. A method which is useful for mounting the mechanical pressure detecting device on a body structure of the motor vehicle is also disclosed. The collision detecting device, on the other hand, may include extensible structures having pressure sensing means attached at their leading ends and capable of protruding outwardly of the vehicle body in accordance with the driving speed of the motor vehicle. The collision detecting device may otherwise include switch means responsive to the initial collision condition, first switch means which is responsive to acceleration greater than a predetermined magnitude and second switch means to be actuated in accordance with a predetermined timing signal.

7 Claims, 50 Drawing Figures

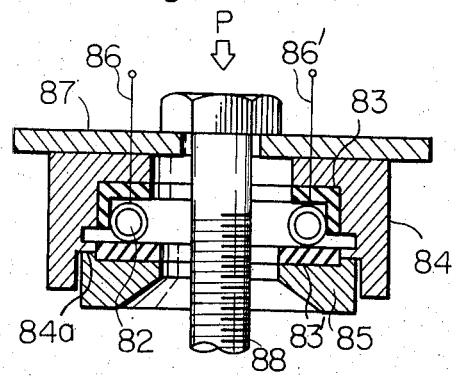
Fig. 12a
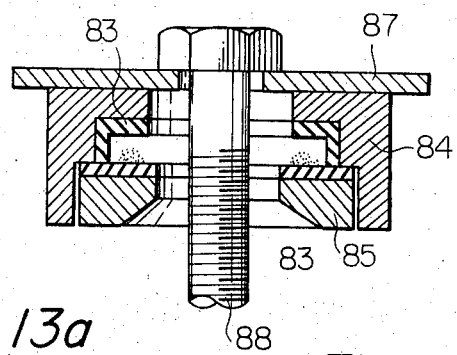
Fig. 12b
Fig. 13a
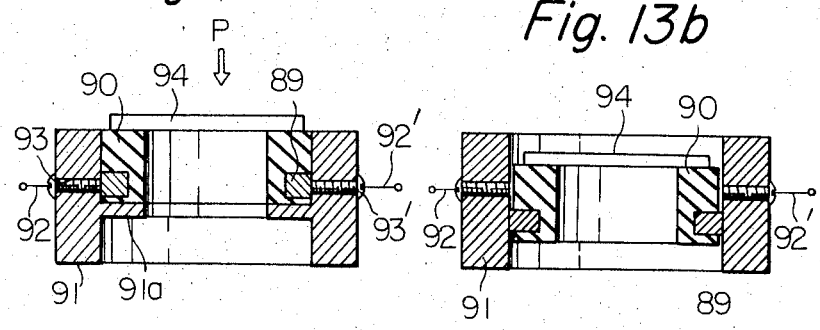
Fig. 13b

Fig. 21c
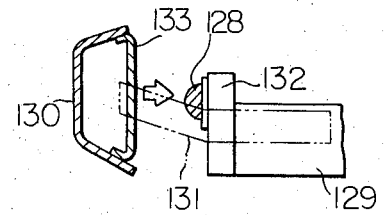
Fig. 22a        Fig. 22b
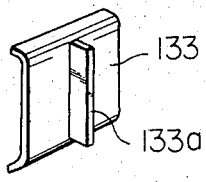   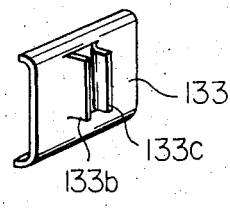
Fig. 23
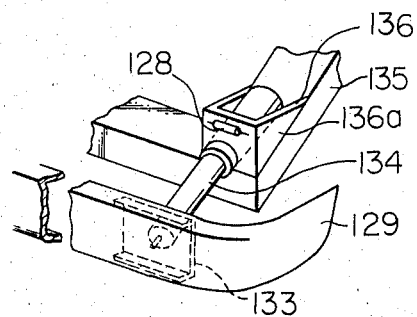

MECHANICAL PRESSURE DETECTING DEVICE

The present invention is concerned with mechanical pressure detecting devices which are adapted to detect unusual deformation, compression or movement of those objects which are brought into violent contact with other stationary or moving objects of machines or vehicles. The pressure detecting devices herein disclosed are especially advantageous for use in various vehicular safety arrangements such as inflatable protector bags or stretchable protector nettings.

The inflatable protector bag or stretchable protector netting is mounted on a motor vehicle for the purpose of protecting the occupant of the motor vehicle from incurring a serious injury in the event of a collision or rapid deceleration of the motor vehicle which is cruising. The protector bag or netting thus serves as a restraint of the occupant of the motor vehicle so that the forward or otherwise directed momentum of the vehicle occupant is substantially absorbed or dampened during the collision condition.

Such vehicular safety arrangement is usually stowed in a folded or collapsed condition in a manner to be ready for being instantaneously expanded or stretched to a protective position intervening between the vehicle occupant and relatively hard parts of the vehicle cabin such as a windshield, an instrument panel, a steering wheel or column and a seat back. (The protector bag, in particular can be used also for the protection of a pedestrian colliding with the motor vehicle if the protector bag is so arranged as to be expanded externally of the vehicle body to intervene between the pedestrian involved in the collision and external parts of the vehicle body such as a fender.)

The protector bag, which is usually made of cloth, rubber or any ductile laminated sheeting of plastics, is expanded and projected to the protective position by blowing the folded bag with a highly pressurized gas which is supplied immediately when the impact resulting from the collision is detected. The protector netting, on the other hand, is usually stowed on the underside of a roof structure of the vehicle body and is focefully stretched in front of or at the rear of the vehicle occupant usually by the aid of a suitable spring mechanism upon sensing of the collision condition. A great deal of research and development effort is presently paid to the vehicular safety arrangements of the above outlined nature so as to cope with the growing number of vehicular accidents of recent days and to meet the local administrative regulations which are becoming more and more exacting.

In order to provide full assurance of safety of the vehicle occupant during the collision, it is of critical importance that the protector bag or netting be capable of assuming the protective position within a time interval in which the vehicle occupant is moved by the force of inertia a certain appreciable distance after the collision condition is initially encountered by the motor vehicle. Experiments have revealed that the distance of forward movement of the vehicle occupant as measured in the case of frontal collisions of the motor vehicles increases approximately in proportion to the square of the time which has lapsed after the collision condition has been initially encountered. If, therefore, the protector bag or netting fails to reach the protective position before the vehicle occupant has moved the critical distance, the result will be that the occupant is caused to forcefully strike against the internal structure of the vehicle body and is accordingly injured seriously especially where the collision bring about relatively rapid deceleration. It is, thus, absolutely important that the collision condition encountered by the motor vehicle be sensed as soon as possible thereby to enable the protector bag or netting to assume its protective position before the vehicle occupant is flung the critical distance.

The degree of deceleration of the motor vehicle as developed as the result of the collision increases generally as the time lapses after the collision condition is initially encountered, and droops at the final stage of the collision condition. This means that the collision condition should be detected within a time interval in which the deceleration of the motor vehicle is of a relatively low degree, for the purpose of enabling the protector bag or netting to be completely expanded or stretched at a proper timing. If, for instance, the collision condition is detected in 15 milliseconds after the collision is initially encountered and if the motor vehicle is then being driven at a speed of 50 kilometers (or about 30 miles) per hour, it is necessary that the protector bag be expanded to its full capacity in about 25 milliseconds for the protection of the vehicle occupant from being seriously injured. The requirement for such rapid expansion of the protector bag, or apparently also the rapid stretching of the protector netting, can be met only by those arrangements which are designed and engineered with extremely sophisticated techniques and at high production costs.

Thus, the time at which the collision condition of the motor vehicle should be sensed is of paramount importance for providing full assurance of safety of the vehicle occupant and, as a consequence, one of the problems which are being thoroughly researched in the related industry is that which is connected to means which is capable of detecting the collision condition as rapidly and efficiently as possible, viz., before the deceleration resulting from the collision reaches a certain critical degree.

The protector bag or netting having the collision detecting means which is capable of responding to the deceleration of a relatively low degree is liable to be actuated to the protective position even in response to those shocks or relatively soft contacts or collisions of the motor vehicle which will not seriously hurt the vehicle occupant as experienced during parking or garaging. In such occasions, the protector bag or netting not only restrains the vehicle occupant but obstructs the frontal viewing of the occupant. If the driver is caught or received by the protector bag or netting thus serving as the restraint, then he is no longer able to properly steer the motor vehicle so as to invite a fatal danger. In the case of the protector bag, moreover, the pressure of air in the vehicle cabin is increased instantaneously by the expansion of the protector bag and consequently the occupant's eardrums and lungs are injured by such increased pressure as well as the sound accompanying the expansion of the protector bag and the blasting of an explosive charge which is usually used to open the container of the pressurized gas. Thus, it is important for the collision detecting means of the protector bag or netting that such means stays inoperative in the event the motor vehicle is subjected to simple shocks or brought into a relatively light contact with other objects.

This particular requirement is apparently not compatible with the above discussed requirement of the protector bag or netting in which the collision detecting means should respond to the deceleration of a relatively low degree. These mutually conflicting requirements can not be met through provision of the detecting means which is capable of responding only to the deceleration of the motor vehicle.

The present invention is directed to mechanical pressure detecting devices which are responsive to unusual mechanical deformation or movement of external structural parts, or the members associated therewith, of especially the motor vehicles encountering collisions. Such pressure detecting devices will prove useful partcularly when combined with the conventional deceleration detectors for the reliable as well as rapid detection of the collision condition of the motor vehicles.

It is, therefore, an important object of the present invention to provide a mechanical pressure detecting device which is adapted to detect a contact or a collision between rigid objects with a force greater than a predetermined magnitude.

It is another important object of the present invention to provide a combination with the conventional deceleration detector of a mechanical pressure detecting device adapted to detect a contact between rigid objects with a force greater than a predetermined magnitude.

It is still another object of the present invention to provide a vehicular safety arrangement in which the conventional deceleration detector is combined with a mechanical pressure detecting device adapted to detect unusual deformation or movement of external structural parts, or the members associated therewith, of a motor vehicle so that the safety arrangement is actuated rapidly and reliably in the event of a collision of the motor vehicle.

It is still another object of the present invention to provide a method by which the mechanical pressure detecting device forming part of the vehicular safety arrangement is effectively mounted on external parts of a body structure of the motor vehicle.

It is still another object of the present invention to provide a device which is adapted to put this particular method into practice.

It is still another object of the present invention to provide a collision detecting switch device for use in the vehicular safety arrangement for the purpose of actuating the safety arrangement to its protective position only when a collision condition which is likely to result in a fatal danger is encountered by the motor vehicle.

The mechanical pressure detecting device according to the present invention generally comprises electrically conductive means which is deformable when subjected to a mechanical pressure which is greater than a predetermined magnitude. When the mechanical pressure greater than such predetermined magnitude is applied to the electrically conductive means, the conductive means is deformed by such pressure so as to supply an electric signal. The electrically conductive means may comprise, in one preferred form, an elongated strip or wire of conductor which is severable when subjected to the mechanical pressure greater than the predetermined magnitude. Otherwise, the electrically conductive means may comprise a rupturable or frangible member having embedded therein a wire extending from one end of the rupturable or frangible member to the other. The wire is connected at its ends to input and output electric lines so as to supply the electric signal when the wire is cut off by the mechanical pressure. This rupturable or frangible member may be constructed of carbon or glass which is readily broken into fragments when subjected to a mechanical pressure greater than the predetermined magnitude. If desired, a knife edge member may be placed in abutting engagement with the rupturable or frangible member so as to assist in the breakage of the rupturable or frangible member when the mechanical pressure is applied in the detecting device. The electrically conductive means may comprise, in still another preferred form, a rupturable or frangible conductor element which is connected to constantly energized input and output electric lines at spaced points thereof. This conductor element may be made of a piece of glass which is coated with electrically conductive layer such as silver.

The strip or wire of conductor, the wire-containing rupturable or frangible member or the electrically conductive rupturable or frangible member may be received within insulating means which may comprise a substantially ductile insulating element. This insulating element may be made of rubber or ductile plastics. Where the rupturable or frangible wire-containing member is to be used together with the kinfe edge member as above mentioned, the knife edge member may be embedded in the insulating element with its sharpened edge held in abutting engagement with the wire-containing member.

In order that the compressive force be more effectively received by to the strip or wire of conductor or the rupturable or frangible member, a presser member which is typically made of metal or rigid plastics may be attached to an outer face of the insulating element.

As an alternative to the above described constructions, the detecting device according to the present invention may comprise electrically conductive means having a conductor element which is carried on a movable support member made of an insulating material. The movable support member is normally held in a position in which the conductor element is in contact with leads of input and in which the conductor element is in contact with leads of input and output electric lines which are usually kept energized. When a mechanical pressure is exerted on the movable support member thus positioned, the support member is moved relative to the leads of the input and output lines and is consequently forced out of contact with the leads, thereby disconnecting the input and output lines from each other.

The above described four forms of electrically conductive, mechanically deformable means are all adapted to remain conducting in normal conditions and to be rendered non-conducting to disconnect the input and output lines from each other when the mechanical pressure greater than the predetermined magnitude is applied to the electrically conductive means. If preferred, however, the electrically conductive means forming part of the detecting device according to the present invention may be constructed in such a manner as to have the input and output lines normally disconnected from each other and to make them interconnected when a mechanical pressure greater than the predetermined magnitude is applied to the conductive means. For this purpose, the conductive means may comprise spaced conductor elements which are connected to input and output electric lines and which are externally received on two insulating elements respectively. One of these insulating elements is associated with or covered by a presser member which is made of a substantially rigid material. When, thus, a mechanical pressure is applied to the presser member, then the presser member is forcibly moved or deformed so as to move the associated conductor element toward the other conductor element until the two conductor elements are brought into contact with each other. In order that the presser member be capable of accurately responding to the mechanical pressure greater than the predetermined magnitude, the presser member may be configured in a manner to gradually protrude centrally outwardly so as to be deformed or collapsed inwardly when subjected to the compressive force. Such purpose may also be accomplished through provision of a releasable or breakable retaining member which is normally held in retaining engagement with the presser member so as to retain the presser member in a position to be operatively disengaged from the conductor element contacting the presser member.

In this instance, the electrically conductive means may be made up of a stationary contact which is attached to an inner face of an end wall of the receptacle opposite to the presser member and a movable contact which is positioned at a spacing from the stationary contact. The stationary and movable contacts are connected to leads of input and output electric lines. The presser member, in this instance, is formed as a plunger extending through the other end wall of the receptacle, having one end projecting outwardly from the receptacle and the other end located adjacent the movable contact. The presser member or plunger is releasably secured to the receptacle by means of suitable breakable member such as a shear pin. If desired, a cover made of a substantially rigid material may be attached to a forward end portion of the receptacle in a manner to contain therein the projecting portion of the plunger.

Where the mechanical pressure detecting device having any of the constructions above described in utilized as part of the vehicular safety arrangement for the purpose of detecting the collision condition of the motor vehicle, the detecting device can preferably be used in combination with a known deceleration detector which is capable of responding to an unusual deceleration condition of the motor vehicle so as to make it possible to detect the collision as rapidly as possible, as previously mentioned. In this instance, the two detector units may be connected either serially to each other or in parallel to an AND-gate element so that the input and output electric lines intervening between the source of electric power and actuating means for the protector bag or netting are interconnected only when both of the detector units become operative. As an alternative, the mechanical pressure detecting device may be used in combination with two different deceleration detectors, one of which is adapted to detect deceleration of a relatively low degree and the other of which is adapted to detect deceleration of a relatively high degree. The mechanical pressure detector unit is connected serially to the low deceleration detector unit and these two detector units are, in turn, connected in parallel with the high deceleration detector unit to an OR-gate element. This arrangement is useful not only because it assures rapid and reliable detection of the collision condition of the motor vehicle but because it provides fail-safe characteristics in which the collision condition can be detected assuredly by means of the high deceleration unit even in case the mechanical pressure detector unit fails to properly operate in the event of the collision of the motor vehicle.

The mechanical pressure detecting device of the vehicular safety arrangement according to the present invention may be mounted at any desired location of the motor vehicle. It may be located on an outer or inner face of the front or rear fender or on an end face of a front structural panel of the vehicle body so as to detect the frontal or rear-end collision or on or within a door structure so as to detect a sidewise collision.

The mechanical pressure detecting device to be used in the vehicular safety arrangement in particular should respond to the compressive force of the order of tons (metric), in view of the magnitude of the impact resulting from the collision of the motor vehicle. It therefore follows that the detecting device will be unable to respond to the compressive force unless a mounting structure for the detecting device or a member or structure to press the detecting device has a sufficient mechanical strength and rigidity. Where the detecting device is to be mounted on a front or rear frame structure which is located inboardly of the fender, such problem will be solved advantageously in such an arrangement in which the detecting device is mounted on an end face of the frame structure through a sufficiently rigid mounting plate which is securely connected to the frame structure. This arrangement is useful especially where the frame structure and the associated fender are located at different levels because the detecting device can be located at any desired level by properly selecting the geometry and/or location of the mounting member relative to the fender. During the collision condition of the motor vehicle, the detecting device is usually pressed upon directly by the inner face of the fender which has been deformed or moved toward the frame structure. In order to enable the detecting device to be pressed upon in a more assured manner, a presser member may be mounted on the inner face of the fender and in alignment with the detecting device. If desired, this presser member may be provided with at least one projection which directed toward the detecting device so as to locally compress the deformable, electrically conductive means of the detecting device. Where the fender is supported by the frame structure by means of support members or structures which are contractable when the fender is subjected to a violent compressive force or impact during the collision condition of the motor vehicle, the detecting device may be mounted on an end face of a mounting member by which the fender support member or structure is secured to the frame structure provided such mounting member is located at the same level as the fender. In this instance, the presser member may be attached to the inner face of the fender for the same reason as previously explained. If, moreover, the contractable support members or structures are of the telescopic constructions each having an inner rod axially movable through an outer tubular member which is fixed on the frame structure, then the detecting device may be located behind the inner rod so as to be hit by the inner rod when the fender is deformed or moved toward the frame structure so that the inner rod of the fender support member is accordingly forced to retract toward the detecting device. In this instance, the detecting device may be mounted on the frame structure preferably by means of a rigid mounting member which is secured to the frame structure. To add to the cushioning effect of the fender of the described construction, the outer tubular member of the fender support member or structure may be secured to the frame structure usually by means of a shear pin so that the support member or structure is released from the frame structure when the fender is subjected to a violent impact.

The mechanical pressure detecting device or the combination of such detecting device and the deceleration detector as used in the vehicular safety arrangement is advantageous over various prior art counterparts in many respects. As compared with the known collision detectors using a radar as an example, the mechanical pressure detecting device or the combination of such device and the deceleration detector is free from the influence of the weather conditions or the disturbances exercised by the motor vehicles running side by side and is considerably easy and economical to manufacture. In spite of such outstanding advantages, the mechanical pressure detecting device or the vehicular safety arrangement using such detecting device still has a drawback in that it responds to the collision condition substantially after the collision has been initially encountered by the motor vehicle. For this reason, the detecting device or the safety arrangement using the detecting device will not be fully acceptable for use in the motor vehicles which are designed to be capable of running at extremely high speeds. With this in mind, the present invention further proposes a new and novel collision detecting device for particular use in the vehicular safety arrangement of the previously described character. This collision detecting device is generally made up of at least two spaced, parallel, substantially identical telescopic or extensible rod structures which are normally held in contracted conditions, mechanical pressure sensing means which is mounted at the leading ends of the telescopic or extensible rod structures and driving means which is operative to cause the telescopic or extensible rod structures to protrude from their contracted conditions when the motor vehicle is driven at a relatively high speed. The mechanical pressure sensing means of this detecting device may be constituted by or include the mechanical pressure detecting device of any of the previously described constructions such as the elongated strip or wire of conductor which is severable when subjected to a voilent impact. As an alternative, the pressure sensing means may comprise an elongated support member carrying thereon a tape switch or a pressure sensitive element of any known type. Or otherwise, the pressure sensing means may comprise sheaves which are mounted at the leading ends of the telescopic or extensible rods, a flexible line which is passed on these sheaves usually in a taut condition, reels around which the flexible line is wound suitable turns at its end portions and tension detecting means operable to detect an increase in the tension in the flexible line. The flexible line may actually be a rope, a strip of suitable flexible material, a wire, or a cable. When the telescopic or extensible rod structures are caused to protrude from their contracted condition at a limited speeds, the flexible line is unwound softly from the reels so that the tension detecting means remains inoperative. When, however, the telescopic or extensible rod structures are caused to protrude at an increased speed, the reels are subjected to considerable mechanical resistances and the flexible line is forced to dislocated unusually with the result that the tension detecting means becomes operative to supply an output signal. The collision condition is in this manner sensed through detection of the tension or an increase in the tension in the flexible line. The collision detecting device of any of the above described constructions may be mounted preferably in association with the front or rear fender of the motor vehicle although the same can also be mounted sidewise of the vehicle body. The driving means forming part of such detecting device may be operated either by human effort or automatically.

As previously noted, one of the most important requirements of the vehicular safety arrangement is that the safety arrangement should be actuated to its protective position when, and only when, a collision condition which is likely to invite a fatal danger on the vehicle occupant is encountered by the motor vehicle. Thus, the vehicular safety arrangement is required to remain inoperative when a collision is encountered in which the occupant of the motor vehicle is subjected to acceleration of a relatively low degree and to become operative only when a collision is encountered in which the vehicle occupant undergoes acceleration of a relatively high degree. Another important requirement of the vehicular safety arrangement is that is such arrangement should be capable of assuming the protective position at a proper timing after the initial collision condition has been encountered by the motor vehicle. These two different requirements can be met by a collision detecting switch device according to the present invention by which the safety arrangement is kept inoperative if the acceleration to be imparted to the vehicle occupant reaches a predetermined magnitude after the proper timing has passed and is actuated to the protective position only if such predetermined magnitude of the acceleration comes into play before the proper timing is reached. The collision detecting switch device of this nature generally comprises first normally-open acceleration responsvie switch means which is closed responsive to acceleration greater than a predetermined magnitude at the initial stage of the collision condition, second normally-open acceleration responsive switch means which is connected serially to the first acceleration responsive switch means and which is closed responsive to acceleration greater than a predetermined magnitude which is greater than the first named predetermined magnitude so that the occupant of the motor vehicle is protected from a fatal danger, a timing circuit having terminals which are connected to input and output terminals, respectively, of the first acceleration detecting switch means, and normally-closed switch means which is connected between the first and second acceleration responsive switch means and which is connected to the timing circuit so as to be opened when a timing set on the timing circuit is passed.

Other features and advantages of the mechanical pressure detecting device, the combination of the detecting device and the known deceleration detector, the vehicular safety arrangement using such detecting device or combination, the method and device adapted to mount the detecting device on the vehicle body, the collision detecting switch device using the extensible rod structures, and the collision detecting device using the electric arrangement will become more apparant from the following detailed description taken in conjunction with the accompanying drawings, in which:

FIG. 4b is a section taken on line IV—IV of FIG. 4a;

FIG. 5b is a section taken on line V—V of FIG. 5a;

FIG. 7b is a section taken on line VII—VII of FIG. 7a;

FIG. 8b is a section on line VIII—VIII of FIG. 8a;

FIG. 10a is a longitudinal sectional view showing the mechanical pressure detecting device, in still another preferred form, according to the present invention;

FIG. 10b is a section on line X—X of FIG. 10a;

FIG. 12a is a sectional view showing the mechanical detecting device, in still another prefered form, according to the present invention;

FIG. 12b is a view similar to FIG. 12a but now shows the detecting device which is in an operative condition;

FIG. 13a is a sectional view showing the mechanical pressure detecting device, in still another preferred form, according to the present invention;

FIG. 13b is a view similar to FIG. 13a but now shows the detecting device in an operative condition;

FIG. 15b is a perspective view of the detecting device which is shown in FIG. 15a;

FIG. 20b is similar to FIG. 20a but now illustrates a modification of the combination shown in FIG. 20a;

FIG. 21c is a cross sectional view of the fender, frame structure and detecting device shown in FIGS. 21a and 21b;

FIGS. 22a and 22b are perspective view showing the pressure members, in different preferred forms, which are applicable to the detecting device mounted in a manner shown in FIGS. 21a to 21b;

FIGS. 23 and 24 are perspective views similar to FIG. 21a but now shows different manners of mounting the detecting device on the vehicle frame structure;

FIG. 25b is a section taken on line XXV—XXV of FIG. 25a;

Figure 1:
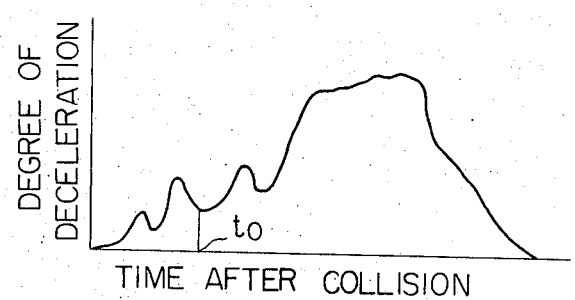
FIG. 1 is a graphic representation of an example of the degree of deceleration of the motor vehicle in terms of the time after the collision has been initially encountered.

Reference is first made to FIG. 1 which illustrates an example of the variation in terms of time of the degree of deceleration of the motor vehicle encountering a frontal collision, in which the time to indicates a timing by which the vehicular safety arrangement of the previously described character should be actuated to the protective condition. For the protection of the occupant of the motor vehicle from injury during the collision, it is important that the collision condition be sensed before a relatively high degree of deceleration develops on the motor vehicle. The conventional deceleration detectors have been designed with a view to meeting only this requirement as previously discussed. The deceleration detectors of this nature, however, raise a problem in that such detectors are responsive to relatively soft collisions or shocks which are unlikely to invite a serious danger on the vehicle occupant and, as a consequence, the protector bags or nettings actuated by the detectors are expanded or stretched so as to unnecessarily restrain the vehicle occupants. The protector bags or nettings thus obstruct frontal viewing of the vehicle drivers and prevent them from properly steering the motor vehicles. In the case of the protector bags in particular, the sudden rise in the air pressure in the vehicle cabins resulting from the instantaneous expansion of the protector bags often cause injuries of the eardrums or even lungs of the vehicle occupants. The requirement for the rapid actuation of the protector bags or nettings and the requirement for avoiding the objectionable actuation of them are apparently conflicting to each other and, as such, the prior art deceleration detectors alone are unsatisfactory for meetng the purpose of reliable operation of the vehicular safety arrangements. The detecting device herein disclosed is useful, when combined with the existing deceleration detector, for the purpose of satisfying these two mutually conflicting requirements. Various embodiments of the detecting device of this nature are illustrated in FIG. 2 of the accompanying drawings, in which the embodiments shown in FIGS. 2 to 13b are adapted to remain conductive under normal conditions while the embodiments shown in FIGS. 14 to 19 are constructed to become conductive only when they are subjected to impacts or violent mechanical pressures.

Figure 2:
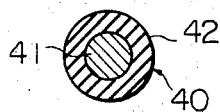
FIG. 2 is a cross sectional view of the mechanical pressure detecting device, in a preferred form, according to the present invention.
Figure 3:
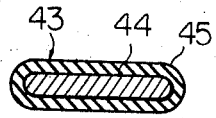
FIG. 3 is a view similar to FIG. 2 but now illustrates the detecting device, in another preferred form.
Figure 4A:
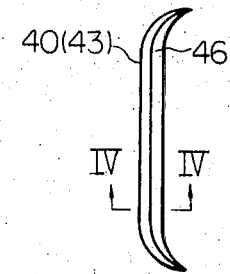
FIG. 4a is a top end view of the front or rear fender of a motor vehicle with the detecting device shown in FIG. 2 or 3 mounted on its outer face.
Figure 4B:
Figure 5A:
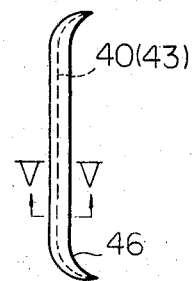
FIG. 5a is a view similar to FIG. 4a but now shows the fender on the inner face of which the detecting device shown in FIG. 2 or 3 is mounted.
Figure 5B:
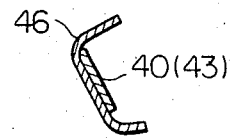
Figure 6:
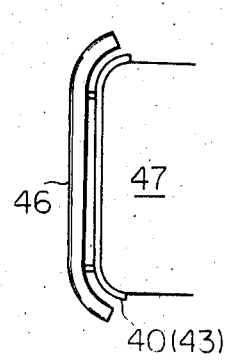
FIG. 6 is a top end view of the front or rear end of a motor vehicle body on which the detecting device shown in FIG. 2 or 3 is mounted behind the fender.

The embodiment shown in FIG. 2 is a most simple form of the mechanical pressure detecting device according to the present invention. The detecting device, generally designated by reference numeral 40, is made up of a thin wire 41 of conductor having a substantially circular cross section and a layer 42 of a flexible insulating material covering the wire 41. FIG. 3 illustrates a modification of the device shown in FIG. 2. This modified detecting device, generally designated by reference numeral 43, is made up of a substantially flat, elongated strip 44 of conductor and a layer 45 of a flexible insulating material. The wire 41 and the strip 44 of conductor are usually kept energized from a suitable source of electric power (not shown). The insulating materials forming the layers 42 and 45 of the detecting devices 40 and 43, respectively, may be rubber or substantially ductile plastics. The gauges and materials of the wire 41 and strip 44 of conductor and the thicknesses and materials of the layers 42 and 45 should be selected in a manner that the wire 41 and strip 44 of conductor are severable when subjected to mechanical pressures which are greater than predetermined magnitudes, respectively. The detecting device 40 or 43 thus constructed may be installed at any desired locations of the vehicle body if such device is to be incorporated in the vehicular safety arrangement of any kind. For instance, the detecting device 40 or 43 may be attached directly to an outer face of a front or rear fender 46 of the motor vehicle as shown in FIGS. 4a and 4b, preferably extending from one end of the fender 46 to the other. As an alternative, the detecting device 40 or 43 may be attached to an inner face of the front or rear fender 46 as illustrated in FIGS. 5a and 5b, also extending from one end of the fender to the other. Or otherwise, the detecting device 40 or 43 may be attached to a front or rear end face of a structural panel 47 of the vehicle body, as seen in FIG. 6. The detecting devices which are mounted in the manners herein illustrated are specifically adapted to guard against frontal or rear-end collisions of the motor vehicle. The locations of the detecting device 40 or 43 are apparently not limited to those herein shown and, if desired, the detecting device may be located within a door structure so as to guard against a sidewise collision of the motor vehicle, though not shown. The detecting device 40 or 43 may be connected to the structural parts of the motor vehicle in any desired manner as using an adhesive or clips.

The detecting devices shown in FIGS. 2 and 3 are advantageous especially where localized deformation is caused of the structural parts of the vehicle body because such devices can be of any length which may be selected so as to be substantially coextensive with the structural parts of the vehicle body on which the devices are to be mounted, as will be appreciated from the illustrations of FIGS. 4a, 5b and 6.

Figure 7B:
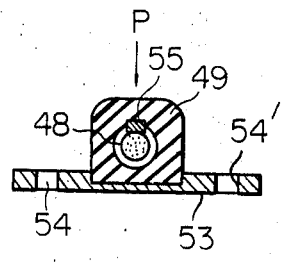
Figure 7A:
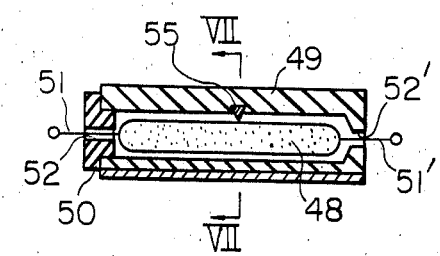
FIG. 7a is a longitudinal sectional view showing the mechanical pressure detecting device, in still another preferred form, according to the present invention.

FIGS. 7a and 7b illustrate another preferred embodiment of the mechanical pressure detecting device according to the present invention. The detecting device, as illustrated, comprises an elongated conductor element 48 of a material which is rupturable or frangible when subjected to a mechanical impact or pressure and a receptacle or an insulating element 49 receiving therein the conductor element 48. The receptacle or insulating element 49 is made of a substantially flexible insulating material such as rubber or ductile plastics and is closed at its open end by an end plug 50 which is also made of a flexible insulatng material. The elongated conductive element 48 is, in one preferred form, made up of a glass or carbon rod having embedded therein a wire 51 which projects outwardly from both ends of the glass or carbon rod through apertures 52 and 52' which are formed in the end plug 50 and the closed end wall of the receptacle or insulating element 49. This wire 51 is usually kept energized from a suitable source of electric power (not shown). In another preferred form, the conductor element 48 may be made up of a glass tube which is coated or plated with an electrically conductive material such as silver and which is connected at both ends to leads of electric lines which are usually kept energized from a source of electric power, though not shown. The receptacle or insulating element 49 is securely carried on a substantially rigid support member 53 which may be formed with mounting holes 54 and 54' through which the detecting device is to be mounted or bolted to any of the structural parts of the vehicle body.

The sizes, configurations and materials of the conductor element 48 and the receptacle or insulating element 49 should be selected so that the conductor element 48 is rupturable or frangible when subjected to a mechanical pressure greater than a predetermined magnitude. When, thus, a mechanical pressure exceeding the predetermined magnitude is applied to the detecting device in the direction of arrow P (FIG. 7b), the conductor element 48 is ruptured or broken into fragments with the result that the leads at both ends of the conductor element are electrically disconnected from each other, thus providing an electric signal which is indicative of the application of the mechanical pressure to the detecting device.

In order to facilitate the conductor element 48 to be readily broken when subjected to the mechanical pressure, a knife edge member 55 may be preferably embedded in the receptacle or insulating element 49 with its sharpened edge held in abutting engagement with the rupturable or frangible conductor element 48, as illustrated.

Figure 8A:
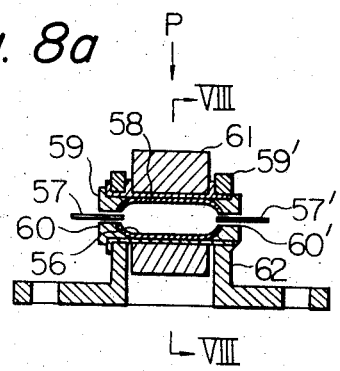
FIG. 8a is a longitudinal sectional view showing the mechanical pressure detecting device, in still another preferred form, according to the present invention.
Figure 8B:
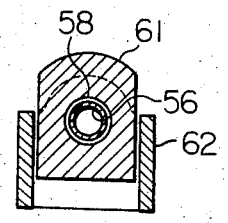

A modification of the mechanical pressure detecting device using the rupturable or frangible conductor element is shown in FIGS. 8a and 8b. The detecting device herein shown has a glass tube 56 coated with an electrically conductive layer and connected at both ends to leads 57 and 57' of electric lines. The glass tube 56 is received in an open-ended cylindrical insulating element 58 which is closed at both ends by end plugs 59 and 59' which are formed with apertures 60 and 60' through which the leads 57 and 57', respectively, of electric lines project outwardly. One of these leads 57 and 57' is connected to a suitable source of electric power and the other of the leads is connected to an actuating means for the vehicular safety arrangement, though not illustrated. The insulating element 58 with the conductor element or glass tube 56 snugly fitted therein is enclosed in a presser member 61 of a rigid material and is securely carried by a bracket 62 with the presser member 61 protruded outwardly. The cylindrical insulating element 58 is made of a suitable flexible material which is subject to deformation when a mechanical pressure greater than a predetermined magnitude is applied to the pressure member 61 and accordingly to the insulating element 58 in the direction of arrow P, whereby the glass tube 56 is broken into pieces. When, thus, the glass tube 56 which is coated with the conductive layer is broken, the leads 57 and 57' of the electric lines are disconnected from each other similarly to the detecting device shown in FIGS. 7a and 7b. The coating of the conductive layer of the glass tube 56 may be applied to the tube in such a manner that a suitable electrically conductive material such as silver is plated or evaporated onto the entire outer peripheral surface of the tube.

Figure 9:
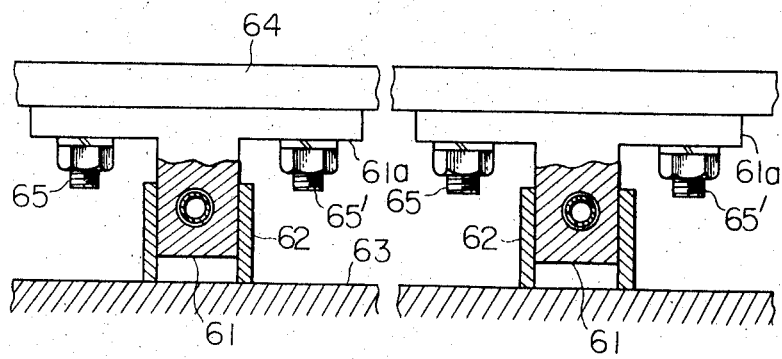
FIG. 9 is a top end view, partly in section, showing an example of the manners for mounting the device of FIGS. 8a and 8b on a vehicle body.

The detecting device shown in FIGS. 8a and 8b is usually mounted with its pressure member 61 protruded outwardly so as to directly receive the mechanical pressure at its top. If, preferred, however, the presser member 61 may be provided with a cross member 61a formed at or connected to the top of the presser member 61, as illustrated in FIG. 9. In FIG. 9, the detecting device is rigidly connected through the bracket 62 to the end face of the vehicle body structure 63 and through the cross member 61a of the presser member 61 to the inner face of the front or rear fender 64 by means of bolts 65 and 65', whereby the detecting device receives the mechanical pressure or impact via the fender 64 during the collision of the motor vehicle.

The embodiment shown in FIGS. 8a and 8b or FIG. 9 is advantageous in that the rupturable glass tube 56 is protected from being broken as long as the mechanical pressure applied to the pressure member 61 is smaller than the predetermined magnitude annd yet can be readily broken into pieces as soon as the pressure exceeding the predetermined magnitude is exerted on the presser member 61 or on the cross member 61a thereof. This advantage results from the specific construction of the detecting device in which the rupturable conductor element or glass tube 56 is received in the flexible enclosure or insulating element 58 and this flexible enclosure, in turn, is enclosed in the rigid presser member 61. The breakage or rupture of the glass tube 56 will be facilitated by maintaining the interior of the glass tube at a subatmospheric pressure.

Figures 10A, 10B:
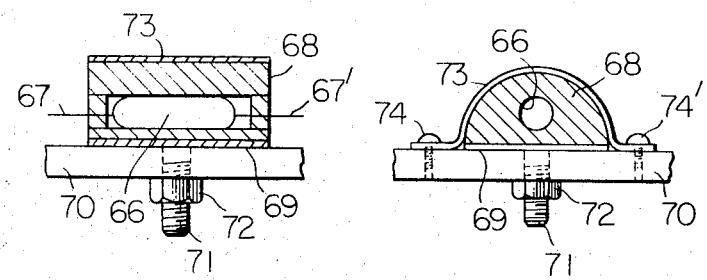
Figure 10C:
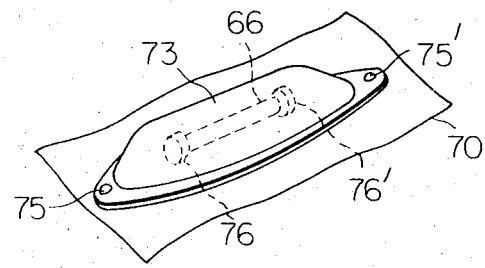
FIG. 10c is a perspective view showing the detecting device shown in FIGS. 10a and 10b.

A further modification of the embodiment shown in FIGS. 8a and 8b or FIG. 9 is illustrated in FIGS. 10a to 10c. The mechanical pressure detecting device herein shown also uses a glass tube 66 which is also coated or plated with a suitable electrically conductive material such as silver and which is connected at both ends to leads 67 and 67' of electric lines. One of these electric is connected to and energized by a source of electric power and the other is connected to an actuating means of the vehicular safety arrangement, though not shown. The glass tube 66 thus acting as the conductor element of the detecting device is received in a flexible enclosure or insulating element 68 having formed in its end walls apertures (not numbered) through which the leads 67 and 67' of the electric lines are passed outwardly respectively. The insulating element 68 acting as cushioning means for the glass tube 66 received therein is made of a substantially flexible material such as rubber or ductile plastics of an insulating property. The insulating element 68 is attached to a substantially flat base plate 69 and is secured through this base plate to any structural member 70 of, say, the motor vehicle body by means of a bolt 71 and nut 72, as seen in FIGS. 10a and 10b. The flexible cushioning or flexible enclosure or insulating element 68 is, in the embodiment shown, so shaped as generally semi-cylindrical with its substantially flat face closely attached to the base plate 69. A cover or presser member 73 which has a semi-cylindrical section configured substantially in agreement with the semi-cylindrical peripheral surface of the insulating elements 68 is secured by screws 74 and 74' to the structural member 70 in a manner to snugly receive the insulating element in its semi-cylindrical section, as seen in FIG. 10b. The base plate 69 and the cover or presser member 73 are made of substantially rigid materials such as metal or hard plastics. The cover or presser member 73 may be configured generally in the form of an inverted tray and secured to the structural member 70 by means of screws 75 and 75' at its opposite ends, as illustrated in FIG. 10c. In this instance, the glass tube 66 to be accommodated within the presser member 73 may contain therein a wire (not shown) extending from one end of the glass tube to the other and is capped at both ends by a pair of rings or terminals 76 and 76', indicated by phantom lines, which are made of a substantially rigid, conductive material. The wire extending through the glass tube 66 is connected at both ends to leads (not shown) of electric lines through these rings or terminals 76 and 76', respectively. The glass tube 66 of this construction is also enclosed in the insulating element of the configuration seen in FIG. 10b. The configuration and mechanical resistance of the cover or presser member 73 of the detecting device shown in FIGS. 10a to 10c should be selected in such a manner that the cover or presser member 73 is deformed or collapsed toward the structural member 70 when the cover or presser member 73 is subjected to a mechanical pressure which is greater than a predetermined magnitude, similarly to the embodiments thus far described. When, thus, a mechanical pressure exceeding the predetermined magnitude is applied to the presser member 73, then it is compressed inwardly of the detecting device so as to press upon the glass tube 66 which is either coated with the electrically conductive material or provided with the wire whereby the glass tube 66 is broken into pieces and the leads of the electric lines which have been connected together through the glass tube or the wire contained therein are disconnected from each other. The glass tube 66 may be internally maintained at a subatmospheric pressure so as to be readily broken into pieces when subjected to the mechanical pressure exceeding the predetermined magnitude.

The embodiments thus using the rupturable or breakable members as illustrated in FIGS. 7a to 10c are advantageous in that they are satisfactorily sensitive to mechanical pressures greater than the predetermined magnitudes because application of such mechanical pressures is responded to by readily rupturable conductive elements and that the component parts of such embodiments need not be constituted of specially rigid or robust materials. In addition, these embodiments are advantageous because the operation of the detecting device is not influenced by a failure, if any, of the electric lines or the arrangement connected thereto as would be caused during the collision condition. The detecting device shown in FIGS. 7a to 10c are, therefore, adapted for placement at any locations of the motor vehicle and will properly and assuredly operate even though they are used at those locations which are subject to irregular deformation when subjected to impacts. Such detecting devices will prove useful especially where they are mounted in association with such a safety arrangement by which the doors of the motor vehicle are locked to prevent the vehicle occupant from being flung out of the vehicle cabin in the event the collision. It is, however, apparent that the devices shown in FIGS. 7a to 10c are conductive to the rapid and reliable detection of the collision condition if they are installed in association with the front or rear fenders so as to guard against the frontal or rear-end collisions of the motor vehicles.

Figure 11:
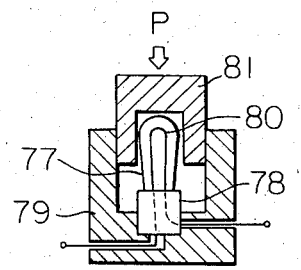
FIG. 11 is a sectional view showing the mechanical pressure detecting device, in still another preferred form, according to the present invention.

FIG. 11 illustrates still another preferred embodiment of the mechanical pressure detecting device of the character using a rupturable or breakable electrically conductive element in accordance with the present invention. The detecting device thus includes an envelope 77 of glass which is generally in the form of a bulb. The glass envelope 77 is supported on an insulating element 78 which, in turn, is mounted at a bottom wall of a receptacle 79. A wire 80 which is breakable when subjected to a mechanical impact greater than a predetermined magnitude is passed through the insulating element 78 and receptacle 79 into the glass envelope in a manner that it projects toward the leading end of the envelope. A presser member 81 is received in the receptacle 79 and is held in abutting engagement with the top of the glass envelope 77. The wire 80 is connected at both ends to leads of input and output electric lines, one of which is connected to a suitable source of power and the other of which is connected to an actuating means of the vehicular safety arrangement, though not shown. When, thus, a mechanical pressure greater than the predetermined magnitude is imparted to the presser member 81, then the presser member is forced toward the bottom wall of the receptacle 79 so that the glass envelope 77 and accordingly that portion of the wire 80 which is located therewithin are caused to instantaneously break. The leads of the input and output electric lines are in this manner disconnected from each other. The receptacle 79 and presser member 81 are usually made of a substantially rigid material. The glass envelope 77 may be preferably internally maintained at a subatmospheric pressure so as to be readily ruptured when subjected to the impact.

FIGS. 12a and 12b show still another preferred embodiment of the type which uses a rupturable electrically conductor element. Thus, the mechanical pressure detecting device as shown includes a rupturable conductor element 82 which is formed as a substantially annular tube of glass which is coated with an electrically conductive material such a silver. The annular glass tube 82 is received on both sides thereof between spaced insulating elements 83 and 83' of a substantially flexible material such as rubber or ductile plastics. These insulating elements 83 and 83', in turn, are received on their outer faces between a presser member 84 and a support member 85, as illustrated. The insulating elements 83 and 83', presser member 84 and support member 85 are usually in disc forms having apertures formed centrally thereof and are generally in alignment with the annular glass tube or conductor element 82. The presser member 84 has formed on its inner peripheral surface an annular projection 84a which is sized and configured in a manner to be breakable or severable from the presser member 84 when subjected to an unusual pressure. The support member 85 is held in abutting engagement at its outer circumferential edge with this annular projection. The annular glass tube 82 coated with the conductive material is connected at its spaced points with leads 86 and 86' of input and output electric lines. The presser member 84 and support member 85 are made of a substantially rigid material such as metal or hard plastics. For the purpose that the detecting device thus constructed be securely mounted on structural parts, such as the fender and fender stay, of the motor vehicle, the presser member 84 may be attached at its outer face to a mounting plate 87 which is connected to the fender (not shown) whereby the detecting device as a whole is securely held in position between the fender and fender stay by means of a bolt 88 or other suitable fastening means extending through the central aperture formed in the detecting device. The conductive glass tube 82 is usually kept energized through the leads 86 and 86' of the input and output lines.

When, now, a mechanical pressure is imparted to the mounting plate 87 in the direction of arrow P as seen in FIG. 12a, this pressure is transferred to the support member 85 through the annular projection 84a of the presser member 84 so that the annular projection 84a issubjected to a counter force corresponding to the mechanical pressure on the support member 85. If, in this condition, the pressure exerted on the annular projection from the support member 85 is greater than a predetermined magnitude, then the annular projection 84a is sheared from the presser member 84 with the result that the presser member 84 and support member 85 are forced to become closer to each other. The conductive glass tube 82 is thus forcefully pressed upon between the insulating elements 83 and 83' and, as a consequence, is caused to be ruptured as illustrated in FIG. 12b whereby the leads 86 and 86' of the input and output electric lines are disconnected from each other. If desired, the movement of the presser member 84 relative to the support member 85 may be limited through provision of an inwardly stepped wall section on the inner surface of the presser member 84 so as to receive the circumferential edge of the support member 85 when the presser member 84 and support member 85 are moved to each other. If, in this instance, the insulating elements 83 and 83' have been initially spaced apart a distance L as seen in FIG. 12a, then the spacing between the insulating elements will be reduced to a distance l when the presser member 84 is moved closer to the support member 85 and accordingly the glass tube 82 is ruptured as seen in FIG. 12b.

FIGS. 13a and 13b illustrate a modification of the embodiment shown in FIGS. 12a and 12b. The embodiment shown in FIGS. 13a and 13b, which is also constructed in a manner to remain conducting in a normal condition, has conductor element 89 embedded in a wall of an insulating element 90 in a manner to be externally exposed at least at two spaced points which are usually diametrically opposed to each other. The conductor element 89 is preferably located at a close proximity to an inner end of the insulating element 90 and is made of a substantially rigid, electrically conductive material such as metal. The insulating element 90 is received in a receptacle 91 having an inner projection 91a on which the insulating element 90 rests at its inner end which is close to the conductor element 89. The insulating element 90 and receptacle 91 are usually shaped as generally cylindrical and as such the conductor element 89 and inner projection 91a usually have annular configurations, although such shapes and configurations of the elements are not limitative of the device shown. The conductor element 89 is connected at its exposed points to leads 92 and 92' of input and output electric lines. These leads 92 and 92' of the electric lines are securely passed through apertures 93 and 93', respectively, which are formed in the wall of the receptacle 91 in alignment with the exposed portions of the conductor element 89, as illustrated. In order to securely hold these leads 93 and 93' in position relative to the receptacle 91, they may be carried in bolts or studs or other suitable inserts (not numbered) which are inserted into the apertures 93 and 93'. If desired, a pressure plate 94 which may serve also as a mounting means may be attached to an inner end of the insulating element 90 as indicated by phantom lines in FIGS. 13a and 13b. The conductor element 89 is usually kept energized through the leads 92 and 92' of the electric lines similarly to the detecting device shown in FIGS. 12a and 12b.

When, thus, a mechanical pressure exceeding a predetermined magnitude is applied either directly or through the pressure plate 94 (if mounted) to the insulating element 90 in the direction of arrow P as seen in FIG. 13a, the pressure is borne by the inner projection 91a of the receptacle 91 which acts, in this condition, as a guide member for the insulating element 90. The inner projection 91a is consequently sheared off the receptacle 91 so that the insulating element 90 is moved axially through the receptacle 91 in the direction in which the mechanical pressure is applied. This causes the conductor element 89 to be disconnected from or brought out of alignment with the leads 92 and 92' as seen in FIG. 13b, with the result that the input and output electric lines connected to the leads 92 and 92' are disconnected from each other.

The embodiments of the mechanical pressure detecting device according to the present invention which have thus far been described in detail are all adapted to remain conducting under normal conditions and to be rendered non-conducting only when the mechanical pressure or impact is applied to the detecting device. The purpose of directly detecting the mechanical pressure or impact can, however, be accomplished in a manner that the detecting device is kept non-conducting in the normal conditions and rendered conducting as soon as the mechanical pressure or impact is applied to the detecting device, as previously discussed. Embodiments which are specifically adapted to be operable in this manner are now described in the following pragraphs.

Figure 14:
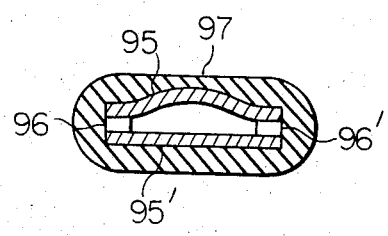
FIG. 14 is a cross sectional view showing the mechanical pressure detecting device, in still another preferred form, according to the present invention.

FIG. 14 illustrates an embodiment, in a most simple form, of the mechanical pressure detecting device of this nature. As illustrated, the detecting device includes a pair of elongated strips 95 and 95' of conductor which are spaced apart from each other by means of spacers 96 and 96' of an insulating material which are usually positioned along the end edges of the strips 95 and 95' of conductor. These spaced strips 95 and 95' of conductor are embedded in or covered with an insulating element 97 of a flexible material such as for example rubber or substantially ductile plastics. The strips 95 and 95' of conductor are connected respectively to leads (not shown) of input and output electric lines. Where the detecting device is to be used in the vehicular safety arrangement, one of these electric lines is connected to a suitable source of electric power and the other of them is connected to an actuating means of the safety arrangement, though not shown. The spacing between and the mechanical properties of the strips 95 and 95' of conductor and the size and material of the insulating element 97 should be selected in such a manner that the strips 95 and 95' of conductor are deformed and forced against each other when a mechanical pressure greater than a predetermined magnitude is applied thereto through the insulating element 97. When the strips 95 and 95' of conductor are thus brought into contact with each other, the leads connected respectively thereto are connected to complete an electric circuit and consequently the detecting device becomes conductive.

Though somewhat different in construction and mode of operation from the detecting devices shown in FIGS. 2 and 3, the detecting device of FIG. 14 have advantages which are essentially similar to those of the devices shown in FIGS. 2 and 3. The detecting device of FIG. 14 is, therefore, advantageously mounted substantially coextensively with the body structure of the motor vehicle, although the same can be mounted and located at limited spots of the vehicle body structure.

Figure 15A:
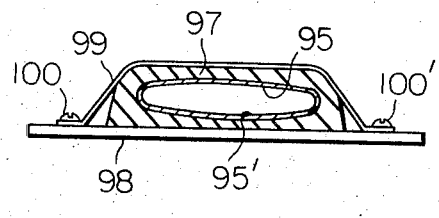
FIG. 15a is a cross sectional view showing the mechanical pressure detecting device, in still another preferred form, according to the present invention.
Figure 15B:
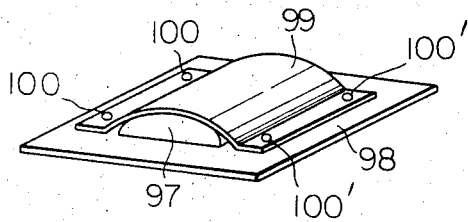

FIGS. 15a and 15b are views which illustrate an embodiment in which the detecting device constructed in a manner essentially similar to the device illustrated in FIG. 14 is received between a substantially flat base plate 98 and centrally outwardly protruded or semi-cylindrical cover or presser member 99 which is attached at its side skirts to the base plate 98 by means of bolts 100 and 100'. This cover or presser member 99 is made of a substantially rigid material which is resistant to a compressive force smaller than a predetermined magnitude and yet deformable when subjected to a pressure exceeding the predetermined magnitude. The flexible insulating element 97 forming part of the detecting device thus constructed serves as a cushioning means for the spaced strips 95 and 95' of conductor received therein so as to protect these strips from contacting each other unless the compressive force greater than the predetermined magnitude is applied to them. The detecting device as a whole is mounted on any of the structural parts of say, the vehicle body through use of mounting holes (not numbered) which are formed in the base plate 98 as seen in FIG. 15b.

Figure 16A:
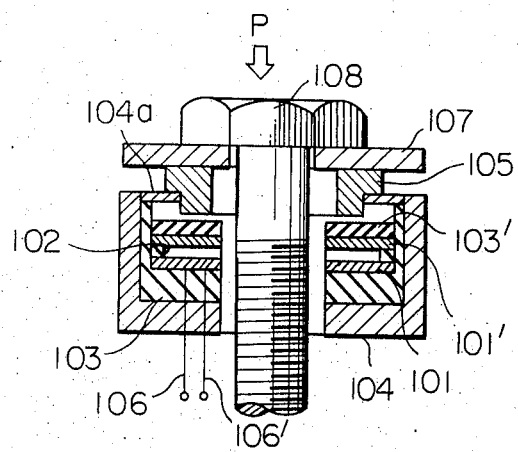
FIG. 16a is a sectional view showing the mechanical pressure detecting device, in still another preferred form, according to the present invention.
Figure 16B:
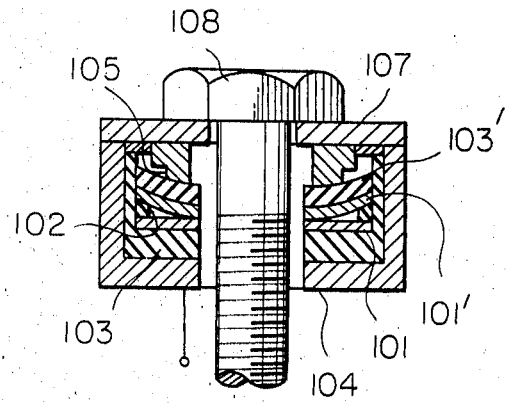
FIG. 16b is a view similar to FIG. 16a but now shows the detecting device in an operative condition.

Another preferred embodiment is illustrated in FIGS. 16a and 16b. The detecting device herein shown, which may be said to be a modification of the embodiment of FIGS. 12a and 12b for itsspecific construction essentially similar to the latter, also has a pair of conductor elements 101 and 101' which are spaced apart from each other by means of a spacer 102 of an insulating material. These conductor elements 101 and 101' are, in the embodiment illustrated assumed to have generally annular configurations and, as such, the spacer 102 is located along the outer circumferential edges of the conductor elements 101 and 101'. The conductor elements 101 and 101' are received at their outer faces on insulating elements 103 and 103', respectively, of a substantially flexible material such as rubber or ductile plastics. One insulating element 103, is shown to have a substantially cylindrical wall which surrounds the other insulating element 103'. The insulating element 103 thus accommodating therein the insulating element 103' and conductor elements 101 and 101' in a sandwiched form is, in turn, received in a receptacle 104. This receptacle 104 has an end wall contacting the outer end face of the insulating element 103 and an annular inner projection 104a which is formed at the end of the cylindrical wall of the receptacle 104, as illustrated. A presser member 105 is held in abutting engagement with this inner projection 104a through its outwardly stepped wall section, extending toward the insulating element 103' which is positioned opposite to the end wall of the receptacle 104. Each of the receptacle 104 and presser member 105 is made of a substantially rigid material such as metal or hard plastics. The size, especially the thickness, and configuration of the inner projection 104a should be selected in such a manner that it can be sheared or removed from the receptacle 104 when it is pressed upon by the presser member by a force greater than a predetermined magnitude. The spaced conductor elements 101 and 101' are connected to leads 106 and 106' of input and output electric lines which are disconnected from each other with the conductor elements 101 and 101' spaced from each other. One of these electric lines is connected to a suitable source of electric power and the other of them is connected to an actuating means of the vehicular safety arrangement, where the detecting device is to be incorporated in such arrangement. A rigid mounting plate 107 may be attached to an outer face of the presser member 105 so as to be mounted on any structural member through a bolt 108 extending through the mounting plate 107 and a central aperture (not numbered) formed in the detecting device as shown. When, thus, a mechanical pressure is imparted to the presser member 105, the inner projection 104a of the receptacle 104 is forced inwardly, viz., toward the outermost insulating element 103' through the outwardly stepped wall section of the presser member 105. If, in this instance, the mechanical pressure applied to the inner projection 104 a is greater than the predetermined magnitude, then the inner projection 104a is sheared from the receptacle 104 and, accordingly, the presser member 105 is permitted to advance toward the end wall of the receptacle. As a result, the outer conductor element 101' is forced against the inner conductor element 101 so that the two conductor elements 101 and 101' are brought into contact at their inner circumferential edges, thereby establishing electric connection between the leads 106 and 106' of the input and output electric lines.

Figure 17A:
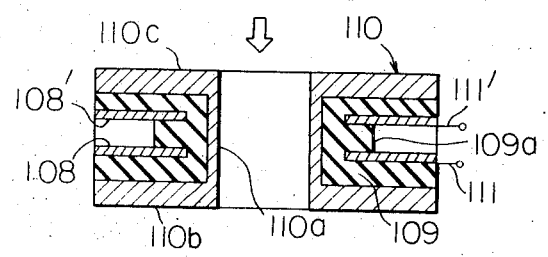
FIG. 17a is a sectional view showing the mechanical pressure detecting device, in still another preferred form, according to the present invention.
Figure 17B:
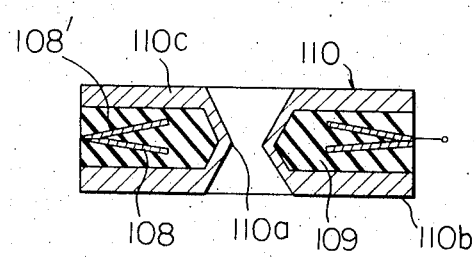
FIG. 17b is a view similar to FIG. 17a but now shows the detecting device in an operative condition.

A modified embodiment of the detecting device shown in FIGS. 16a and 16b is illustrated in FIGS. 17a and 17b. This modified embodiment is essentially similar in mode of operation to the embodiment shown in FIGS. 16a and 16b except in that the space conductor elements are forced to contact each other at their outer circumferential edges. The detecting device shown in FIGS. 17a and 17b thus includes a pair of spaced conductor elements 108 and 108' of generally disc forms. These spaced conductor elements 108 and 108' are received by a unitary insulating element 109 having formed in its outer peripheral wall an annular groove 109a of suitable thickness and depth. The conductor elements 108 and 108' are attached to opposed inner faces defining this annular groove 109a and are anchored at their inner circumferential edges into the insulating element 109. The insulating element 109 thus supporting the spaced conductor elements 108 and 108' therein is carried by a receptacle 110 having a central cylindrical wall 110a and a pair of spaced flanges 110b and 110c. The insulating element 109 is received snugly between these spaced flanges 110b and 110c and is held in contact at its inner peripheral surface with the cylindrical wall 110a of the receptacle 110, as illustrated. The insulating element 109 is made of a substantially flexible material of an insulating property such as rubber or ductile plastics while the receptacle 110 is made of a substantially rigid material such as metal or hard plastics. The cylindrical wall 110a of the receptacle 110 has a thickness which is selected in such a manner that the cylindrical wall is deformed or collapsed when subjected to a mechanical pressure which is greater than a predetermined magnitude. The conductor elements 108 and 108' are connected to leads 111 and 111', respectively, of input and output electric lines which are usually disconnected from each other since the conductor elements 108 and 108' are normally kept spaced apart from each other. One of these electric lines is connected to a source of electric power and the other of them is connected to an actuating means of the vehicular safety arrangement if the detecting device as shown is used as part of such arrangement.

When, thus, a mechanical pressure which is greater than the predetermined magnitude is exerted on the detecting device shown in FIGS. 17a and 17b, then the flanges 110b and 110c of the receptacle are forced toward each other through the insulating element 108 whereupon the cylindrical wall 110a of the receptacle 110 is caused to collapse inwardly. As a consequence, the spaced flanges 110b and 110c are permitted to draw nearer to each other by the pressure exerted on the flange 110b with the result that the conductor elements 108 and 108' are forced against each other at their outer circumferential edges, as seen in FIG. 17b. The leads 111 and 111' connected to the conductor elements 108 and 108', respectively, are thus connected to each other so that a closed circuit is established between the input and output lines through the conductor elements 108 and 108'.

Figure 18:
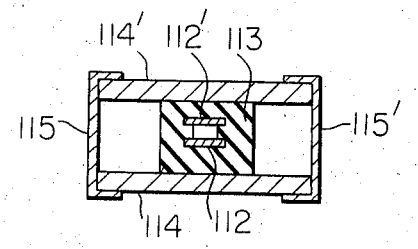
FIG. 18 is a sectional view showing the mechanical pressure detecting device, in still another preferred form, according to the present invention.

FIG. 18 illustrates still another modification of the embodiment shown in FIGS. 16a and 16b. Thus, the mechanical pressure detecting device herein shown also includes a pair of spaced conductor elements 112 and 112' which are received within a unitary insulating element 113 in a manner that each of the conductor elements has its side edges anchored to the adjacent wall of the insulating element 113. The insulating element 113 receiving the conductor elements 112 and 112' in this manner is accommodated within a receptacle which is made up of a pair of spaced end plates 114 and 114' which are respectively attached to both end faces of the insulating element 113 and a generally cylindrical wall 115 which is rigidly connected at its ends to the outer edges of these end plates 114 and 114'. This cylindrical wall 115 is so intended as to serve similarly to the collapsible cylindrical wall 110a of the receptacle of the embodiment shown in FIGS. 17a and 17b and, as such, should have a thickness and a mechanical strength which are selected in a manner that the cylindrical wall 115 can be deformed or collapsed when subjected to a mechanical pressure greater than a predetermined magnitude. The spaced conductor elements 112 and 112' are connected to leads of input and output electric lines, though not shown in FIG. 18. The operation of the detecting device of the above described construction is essentially similar to that of the detecting device shown in FIGS. 17a and 17b and, therefore, the discussion given to the latter applies to the former as it is.

Figure 19:
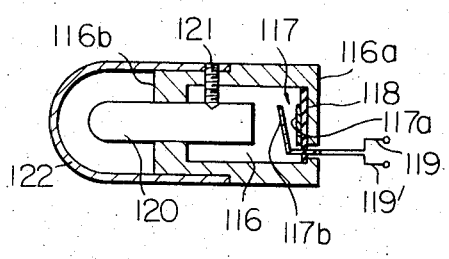
FIG. 19 is a longitudinal sectional view showing the mechanical pressure detecting device, in still another preferred form, according to the present invention.

Still another preferred embodiment of the mechanical pressure detecting device of the normally non-conducting character is illustrated in FIG. 19. The detecting device herein shown includes a receptacle 116 of a suitable substantially rigid material in which a normally-open switch 117 is accommodated. This normally-open switch 117 is made up of a stationary contact 117a which is securely attached to an inner face of an end wall 116a of the receptacle 116 through an insulating element 118 and a movable contact 117b which is spaced from and movable to the stationary contact 117a. The stationary and movable contacts 117a and 117b, respectively, are connected to leads 119 and 119' of input and output electric lines. One of these electric lines is connected to a source of power and the other of the lines is connected to an actuating means for the vehicular safety arrangement where the detecting device is to be used in such arrangement, though not illustrated. A plunger 120 extends through the other end wall 116b opposite to the end wall 116a of the receptacle, having its leading end projection outwardly from the receptacle 116 and terminating at a spacing from the movable contact 117b. This plunger 120 is fixed to the receptacle 116 by means of releasable retaining means such as a shear pin 121 which is anchored to the receptacle 116. The plunger 120 is thus precluded from moving toward the end wall 116a of the receptacle 116 under a normal condition of the detecting device. A cover or pressure member 122 is positioned in a manner to enclose the protruded portion of the plunger 120 therewithin and is secured to a leading end portion of the receptacle through use of the shear pin 121. The receptacle 116, plunger 120 and cover or presser member 122 are all made of rigid materials. The material and configuration of the cover or presser member 122, in particular, should be selected so that the member 122 can be deformed or broken into pieces when subjected to a mechanical pressure which is greater than a predetermined magnitude. Likewise, the mechanical strength of the shear pin 121 should be selected so that it can be sheared when subjected to a shearing stress greater than a predetermined limit. Thus, the plunger 120 can be freed of the restraint of the shear pin 121 only when the mechanical pressure greater than the predetermined magnitude is applied to the cover or presser member 120 and the shearing stress greater than the predetermined limit is imparted to the shear pin 121. When, thus, the cover or presser member 120 is deformed or broken into pieces by application thereto of such mechanical pressure, the plunger 120 is forced toward the end wall 116a of the receptacle against the opposing effort exerted by the shear pin 121. If, in this condition, the shearing stress applied to the shear pin 121 is greater than the predetermined limit, then the plunger 120 is released from the shear pin 121 and thus violently strikes against the movable contact 117b of the normally-open switch 117. This movable contact 117b is consequently forced against the stationary contact 117a of the switch 117, thereby connecting the leads 119 and 119' of the input and output electric lines so as to complete a closed circuit through the contacts 117a and 117b. The mechanical pressure detecting device thus constructed and operating is usually mounted on any structural part (not numbered) of, say, the motor vehicle through the end wall 116a of the receptacle 116, as illustrated in FIG. 19.

Various embodiments of the mechanical pressure detecting device according to the present invention have thus far been described. As mentioned at the outset of this specification, these embodiments of the detecting device are advantageous especially for use in the vehicular safety arrangements using the inflatable protector bags or stretchable protector nettings, if the detecting device is used in combination with the conventional deceleration detector or detectors. Thus, the present invention also contemplates provision of useful combinations of the mechanical pressure detecting device of any of the constructions previously described and the deceleration detector which is known per se. Three preferred forms of such combination are illustrated schematically in FIGS. 20a and 20c.

Figure 20A:
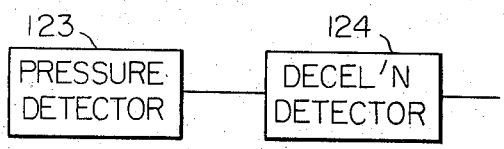
FIG. 20a is a block diagram schematically showing a combination of the mechanical pressure detecting device shown in any of FIGS. 2 to 19 and a known deceleration detector.
Figure 20B:
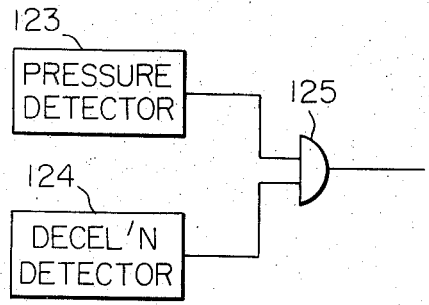

FIG. 20a illustrates a combination in which a mechanical pressure detector unit 123 is connected serially to a deceleration detector unit 124 while FIG. 20b illustrates a combination in which the mechanical pressure detector unit 123 and the deceleration detector 124 are connected in parallel to an AND-gate element 125. In either of the combinations shown in FIGS. 20a and 20b, an output signal is produced only when the two detector units are actuated, viz., when the mechanical pressure detector unit 123 responds to a mechanical pressure greater than a predetermined magnitude and, at the same time, the deceleration detector unit 124 responds to a deceleration which is higher than a predetermined degree. If the thus combined detector units are used in the vehicular safety arrangement for the detection of a collision condition, the safety arrangement is prevented from being objectionably actuated if the deceleration of the motor vehicle reaches the predetermined critical degree when the motor vehicle undergoes those shocks or collisions which are of the nature unlikely to lead to fatal dangers to the vehicle occupants. Under this condition, the safety arrangement is kept at a standstill in the absence of an output signal from the pressure detector unit 123 even though the signal from the deceleration detector unit 124 is present. In the event a collision is actually encountered by the motor vehicle, the output signals are issued from both of the detector units 123 and 124 within a time interval in which the deceleration of the motor vehicle is still premature so that the safety arrangement is actuated to its protective position before a violent impact is applied to the vehicle occupant.

Figure 20C:
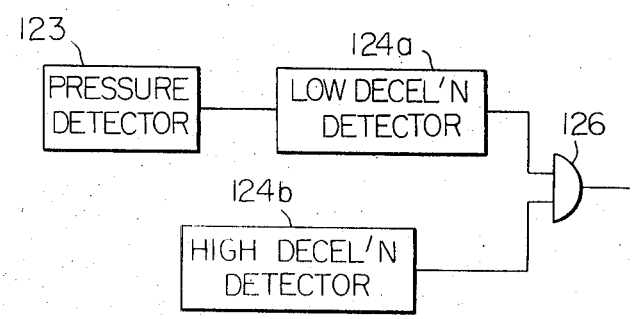
FIG. 20c is a block diagram schematically showing a combination of the mechanical pressure detecting device shown in any of claims 2 to 19 and two different deceleration detectors.

FIG. 20c illustrates a combination in which the mechanical pressure detector unit 123 is used in combination with a deceleration detector unit 124a responsive to a relatively low degree of deceleration and a deceleration unit 124b responsive to a relatively high degree of deceleration. The pressure detector unit 123 and the low-deceleration detector unit 124a are connected serially to each other and these, in turn, are connected in parallel with the high-deceleration detector unit 124b to an OR-gate element 126. The combination of this nature not only offers those advantages which are attained in the combinations shown in FIGS. 20a and 20b but is useful for properly actuating the safety arrangement even in the event the mechanical pressure detector unit 123 or the low-deceleration detector unit 124a fails to operate during the collision condition because the collision condition can be assuredly responded to by the high-deceleration detector unit 124b if and when the deceleration encountered reaches a certain critical degree.

The deceleration detectors usable in the combinations shown in FIGS. 20a to 20c may be of any known construction utilizing, by way of example, movement by a force of inertia of a spring-loaded or magnet-attracted object.

Figure 21A:
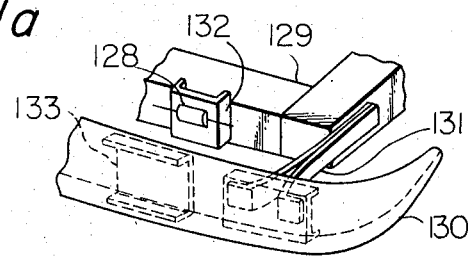
FIGS. 21a and 21b are fragmentary perspective views, as viewed in different directions, showing the fender and the associated motor vehicle frame structure on which the mechanical pressure detecting device according to the present invention is mounted.
Figure 21B:
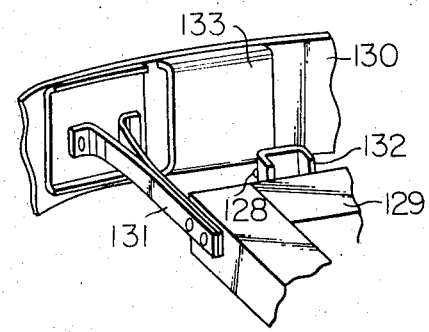

Generally, the mechanical pressure detecting device for use in the vehicular safety arrangements is required to respond to pressures of the order of several metric tons for the purpose that those shocks or relatively soft collisions of the motor vehicle which are unlikely to invite a serious danger to the occupant of the vehicle are not responded to. The mechanical pressure detecting device would therefore remain inoperative unless a structure supporting the detecting device or a member pressing the detecting device during the collision condition has a sufficient mechanical strength or rigidity. FIGS. 21a to 21c illustrate an arrangement which is specifically adapted to mount the detecting device at the front or rear part of the motor vehicle body in a manner to be capable of reliably responding to the mechanical pressure of the order of several tons during the collision condition.

Referring to FIGS. 21a to 21c, the mechanical pressure detecting device 128, which may be of any construction previously described, is shown as being mounted on an outer face of a cross member 129 of a frame structure of the motor vehicle. This cross member 129 is located behind a fender 130 which is carried by the frame structure by usual rigid support structures 131 only one of which is herein shown. The detecting device 128 may be attached directly to the outer face of the cross member 129. If, however, the cross member 129 and fender 130 are located at different levels as is usually the case, the detecting device 128 may preferably be supported by the cross member 129 by means of a mounting plate 132 so that the detecting device is substantially aligned with the fender 130, as illustrated. It is, in this instance, important that the mounting plate 132 be made of a sufficiently rigid material and securely connected to the cross member 129. During the collision condition of the motor vehicle, the detecting device 128 is usually forced against the inner face of the fender 129 which has been deformed or moved toward the cross member 129. In order that the detecting device 128 be pressed upon in a more assured condition, a presser member 133 may preferably be attached to the inner face of the fender 130, located in alignment with the detecting device 128. The presser member 133 should also be constructed of a sufficiently rigid material and securely connected to the inner face of the fender 130. When, thus, the fender 130 is deformed or moved in the event of a collision of the motor vehicle, the presser member 133 is moved in the direction of arrow as seen in FIG. 21c and accurately strikes against the detecting device 128. The presser member 133 may be configurated as generally flat as seen in FIGS. 21b and 21c but, if preferred, the member may be provided with at least one projection which is directed toward the detecting device 128. FIG. 22a illustrates an example of the presser member 133 which has a single vertically extending projection 133a formed on its outer face while FIG. 22b has a pair of spaced parallel projections 133b and 133c also extending vertically on the outer face of the presser member.

FIG. 23 illustrates another arrangement in which the detecting device, designated also by 128, is mounted in association with a front or rear fender 129 which, in this instance, is supported by a contractable or retractable support structure 134 only one of which is herein seen. The support structure of this nature are intended to absorb a portion of the energy of impact imparted to the fender in the event of a collision of the motor vehicle. As illustrated, the contractable support member 134 is secured to a side member 135 of the frame structure of the vehicle body through a mounting member 136 having a flat end wall 136a. The mechanical pressure detecting device 128 is attached directly to this end wall 136a of the mounting member 136. If, in this instance, the end wall 136a of the mounting member 136 is not exactly aligned with the fender 130, the previously described presser member 133 may be attached to the inner face of the fender 130 in alignment with the detecting device 128, as indicated by phantom lines in FIG. 23. When, thus, the fender 130 is forced toward or against the frame structure, in response to the impact by the collision of the motor vehicle, the support structure 134 is caused to retract inwardly through the mounting member 136 so that the fender 130 or the presser member 133 strikes forcefully against the detecting device 128 on the mounting member 136 whereby the collision condition is accurately detected by the detecting device 128.

Figure 24:
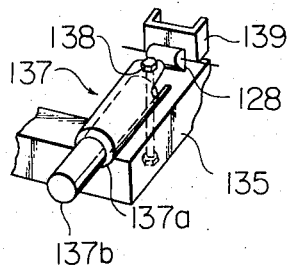

FIG. 24 illustrates still another arrangement in which the mechanical pressure detecting device 128 is mounted in combination with a telescopic support structure 137 which is carried on the side member 135 of the frame structure so as to support the fender 130 in a manner to be contractable when subjected to a mechanical pressure greater than a predetermined magnitude. The telescopic support structure 137 thus includes an outer tubular member 137a which is rigidly secured to the side member 135 of the frame structure and an inner rod 137b which is axially movably received in the tubular member 137a and releasably fixed to the tubular member by suitable breakable means such as a shear pin 138. The mechanical pressure detecting device 128 is located behind this support structure 137 thus constructed and is secured to the side member 135 of the frame structure by means of a rigid mounting member 139 having a substantially flat end face. The detecting device 128 attached to the end face of the support member 139 in this manner is positioned so as to be aligned with the inner rod 137b of the support structure 137. When, thus, the fender (not shown) is inwardly deformed or moved as a result of the collision of the motor vehicle, the inner rod 137b of the support structure 137 is forced inwardly and, if the pressure exerted thereon is greater than a predetermined magnitude, then the shear pin 138 is broken so that the rod 137b is permitted to move through the outer tubular member 137a. As a consequence, the rod 137b violently hits the detecting device 128 on the support member 139 whereby the collision condition can be accurately detected.

Although the arrangements which have been illustrated in FIGS. 21 to 24 are directed to the cases where the mechanical pressure detecting device is to be mounted at the front or rear part of the motor vehicle so as to guard against the frontal or rear-end collision, such are solely by way of example and, therefore, the arrangements disclosed herein are essentially applicable for the purposes of mounting the detecting device at any desired location of the motor vehicle.

The mechanical pressure detecting device and the combination of such device and the known deceleration detector or detectors as used in the vehicular safety arrangement have numerous advantages which have thus far been discussed in connection with the various embodiments of the device or the combination including such device. The detecting device or the combination of such device and the deceleration detector, however, still has a drawback in that it responds to the collision condition substantially after the collision has been initially encountered by the motor vehicle. Thus, the present invention further contemplates provision of a new and novel collision detecting device which is specifically adapted for use in the vehicular safety arrangements of the previously described character.

Figure 25A:
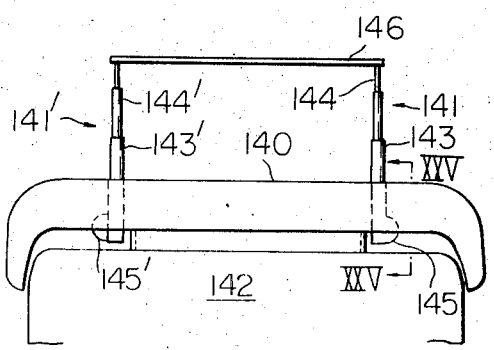
FIG. 25a is a top end view showing the collision detecting device, in a preferred form, according to the present invention.
Figure 25B:
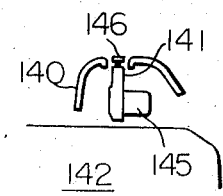
Figure 26:
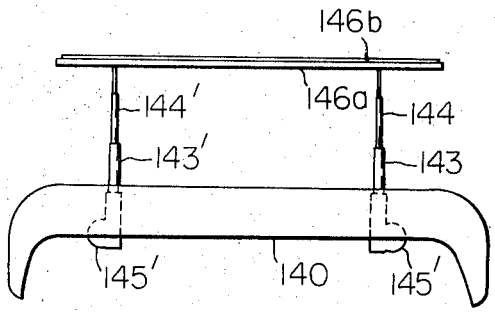
FIG. 26 is a view similar to FIG. 25a but now shows a modification of the collision detecting device.

A first preferred embodiment of such collision detecting device is illustrated in FIGS. 25a and 25b. As illustrated, the collision detecting device is exemplified as being installed in association with a front or rear fender 140. The collision detecting device includes a pair of spaced, parallel, substantially identical telescopic or extensible rod structures 141 and 141' which are shown as being secured at their inner ends to a body structure 142 of the motor vehicle. The telescopic rod structures 141 and 141' are made up respectively of stationary outer tubular members 143 and 143' and extensible inner rods 144 and 144' which are axially movable through the associated outer tubular members. The inner rods 144 and 144' are associated with suitable driving means such as electric motors 145 and 145', respectively, which are mounted usually on the body structure 142. These electric motors 145 and 145' are adapted to be responsive to the driving speed of the motor vehicle and drives the inner rods 145 and 145', respectively, to protrude forwardly of the body structure when the driving speed of the motor vehicle exceeds a predetermined limit. A mechanical pressure sensing means 146 is mounted at the leading ends of the rods 144 and 144' of the telescopic rod structures 141 and 141', respectively, and is disposed substantially in parallel to the fender 140 as illustrated. With the collision detecting device thus constructed and arranged, the movable inner rods 145 and 145' are usually held in or biased to retracted positions with the pressure sensing means 146 positioned within or held substantially flush with the fender 140 as seen in FIG. 25b when the motor vehicle is being driven at a relatively low speed or maintained at a halt. When the driving speed of the motor vehicle reaches the predetermined level, then the electric motors 145 and 145' are actuated to drive the inner rods 144 and 144' of the telescopic rod structures 141 and 141', respectively, so that the rods 144 and 144' are caused to protrude from the fender 140 as seen in FIG. 25a. The mechanical pressure sensing means 146 may be constructed in any desired manner as using the known tape switch or suitable pressure sensitive element. It is, however, preferable that the sensing means 146 be of any of the constructions which have been described with reference to FIGS. 2 to 19 of this specification. Where the tape switch or pressure sensitive element or the detecting device of the character which is shown in FIG. 2, 3 or 14 is to be used as the pressure sensing means 146, an arrangement shown in FIG. 26 will advantageously suit the purpose. As shown in FIG. 26, the mechanical pressure sensing means 146 includes a base member 146a attached to the leading ends of the extensible rods 144 and 144' and a pressure sensing element 146b of the above mentioned nature which is secured to an outer face of the base member 146a. In order to add to the coverage of the sensing means 146 thus constructed, the sensing means 146 may be extended at both ends so that the sensing means 146 projects laterally from the leading ends of the rods 144 and 144', if desired.

Figure 27:
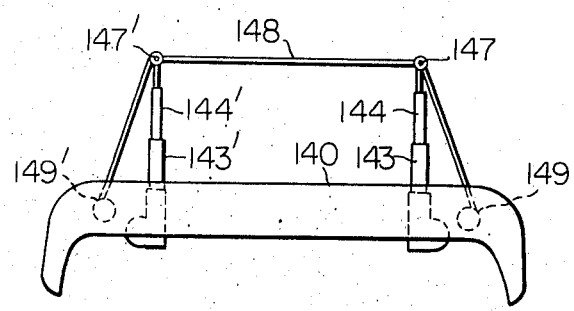
FIG. 27 is also similar to FIG. 25a but shows another modification of the collision detecting device.

FIG. 27 illustrates a modification of the embodiment shown in FIGS. 25a and 25b or FIG. 26. Similarly to the embodiments which are above described, the collision detecting device herein shown uses the telescopic rod structures 141 and 141' which are driven by the electric motors 145 and 145'. Different from the previously described embodiments, the collision detecting device shown in FIG. 27 has a modified mechanical pressure sensing means comprising a pair of sheaves 147 and 147' which are mounted at the leading ends of the extensible rods 144 and 144', respectively, a flexible line 148 which is passed on these sheaves 147 and 147' and tension detecting means (not shown) operable to detect an increase in the tension in the flexible line 148 and to supply a signal when the increase in the tension in the flexible line exceeds a predetermined limit. The flexible line 148 may be a rope, a strip of suitable flexible material, a wire, or a cable. This flexible line 148 is wound at their opposite end portions on reels 149 and 149' which are usually mounted on the body structure 142 of the motor vehicle. When the extensible rods 144 and 144' are caused to protrude at a moderate speed as during relatively low speed driving of the motor vehicle, the flexible line 148 is unwound softly from the reels 149 and 149'. If, however, the extensible rods 144 and 144' are caused to protrude violently or at a relatively high velocity, then the reels 149 and 149' are subjected to a relatively great mechanical resistance with the result that an increased tension is produced in the flexible line 148. This flexible line 148 associated with the tension detecting means (not shown) which is adapted to detect the increase in the tension of the flexible line 148 as above mentioned produces a signal when such tension increases the predetermined limit.

In any of the embodiments shown in FIGS. 25a to 27, the electric motors 145 and 145' for driving the extensible rods 144 and 144', respectively, may be controlled in such a manner that the extensible rods 144 and 144' are caused to protrude when the driving speed of the motor vehicle increases the predetermined limit as previously discussed or that the rods 144 and 144' are caused to protruded over distances which are substantially proportional to the driving speed of the motor vehicle. If desired, an additional arrangement may be provided so that the signal from the pressure sensing means be disregarded or cut off if the driving speed of the motor vehicle is lower than a predetermined level or if the lengths of protrusion of the extensible rods are smaller than a predetermined value. Such arrangement will be useful for preventing the vehicular safety arrangement from being objectionably actuated to the protective position in response to a collision which is unlikely to invite a serious danger to the occupant of the motor vehicle.

The collision detecting device as described hereinbefore is useful for the purpose of detecting the collision condition substantially before the motor vehicle actually encounters the collision so as to enable the safety arrangement to assure the protective position at a proper timing. If, in this regard, the collision condition is detected in 15 milliseconds after the collision has been initially encountered as is the case with the conventional collision detectors and if the motor vehicle is then being driven at a speed of 50 killometers (or about 30 miles) per hour, it is necessary that the safety arrangement be completely actuated to the protective position in about 25 milliseconds for providing full assurance of protection of the vehicle occupant from injury. If, in the collision detecting device according to the present invention, the extensible rods are caused to protrude about 300 millimeters under the same driving condition of the motor vehicle, it is enough for the safety arrangement to be actuated to the protective position within an interval of the order of 600 milliseconds. This will provide utmost ease of designing the safety arrangement. From another point of view, if the safety arrangement be actuated to the protective position within the same interval as in the case of the conventional counterparts, then the safety arrangement will be operable for the collision encountered when the motor vehicle is being driven at a speed of 80 killometers (or about 50 miles) per hour.

Figure 28:
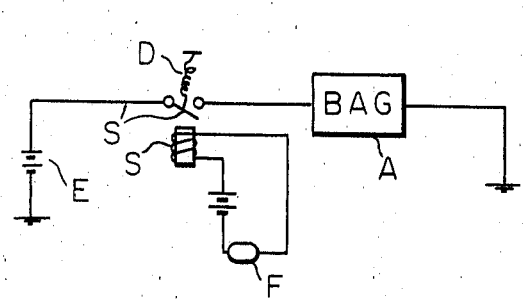
FIG. 28 is a schematic view partly in section of the vehicular safety arrangement using the mechanical pressure or collision detecting device thus far shown.

FIG. 28 diagrammatically illustrates an example of the overall construction of the vehicular safety arrangement using the mechanical pressure or collision detecting device hereinbefore described. In the arrangement shown, reference character A denotes the inflatable protector bag or stretchable protector netting which is associated with suitable actuating means adapted to actuate the bag or netting to the protective position. In the case of the protector bag, this actuating means may include a source of a fluid under pressure which is stored in a closed container. This container or other actuating means is electrically connected to the mechanical pressure or collision detecting device F of the character previously discussed and to the deceleration detector switch D. The deceleration detector switch D is shown as comprising a normally energized solenoid device S and a normally-closed switch element S'. The solenoid device S is energized through an electric circuit including the pressure or collision detecting device F which, in the example shown, is assumed to be of the normally conducting type. When, thus, the motor vehicle encounters a collision, then the pressure or collision detecting device F is actuated to become non-conducting so that the solenoid device S is de-energized. The switch S', which has been maintained in the open position with the solenoid device S energized, is closed provided the deceleration thereby detected is greater than the predetermined magnitude. The actuating means for the protector bag or netting is in this manner connected to the source of power E so that the protector bag or netting is actuated to the protective position.

Figure 29:
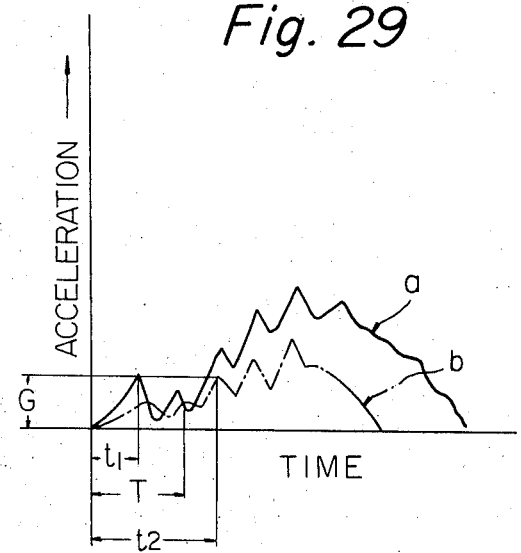
FIG. 29 is a graphic representation of examples of the variations of the accelerations during different collision conditions of the motor vehicle.

Now, FIG. 29 shows examples of the variations, in terms of time which has lapsed after the initial stage of the collision, of the acceleration which is imparted to the vehicle occupant involved in the collisions of different degrees. Thus, the curve $a$ indicates the variation of the acceleration during the relatively forceful collision while the curve $b$ indicates the variation of the acceleration during the relatively light collision. The time T indicates a limit of the time interval within which the safety arrangement should be actuated to the protective position. This time T is determined in accordance with the time required for the actuation of the safety arrangement and the speed at which the vehicle occupant is forwardly flung during a frontal collision. It is thus seen in FIG. 29 that the same degree of acceleration, indicated by G, is reached at different timings depending upon the degree of the collision encountered. In the case of the relatively forceful collision as indicated by the curve $a$, such predetermined degree of acceleration G is reached before the time T as at $t_1$ while, in the case of the relatively light collision, the degree of deceleration G is reached at time $t_2$ which is posterior to the time T. In order that the vehicular safety arrangement be operable with satisfactory reliability and at a proper timing, it will be advantageous if the safety arrangement is kept inoperative when the predetermined degree of acceleration G is reached after the lapse of the time T and is actuated only when such predetermined degree of acceleration G is reached within a time interval between the initial stage of the collision as indicated at point 0 and the time T. Embodiments of the collision detecting switch device which is adapted to achieve such performance are illustrated in FIGS. 30, 31, 32 and 33.

Figure 30:
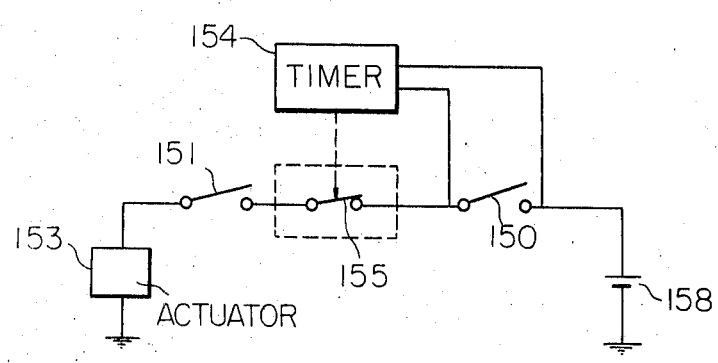
FIG. 30 is a schematic view partly in block form of a circuit arrangement of the collision detecting switch device, in a preferred form, according to the present invention.

Referring first to FIG. 30, the collision detecting switch device of the above described nature includes first and second normally-open acceleration responsive switch means 150 and 151 which are connected serially to each other between a power source 152 and actuating means 153 for the safety arrangement. The first acceleration responsive switch means 150 is adapted to be closed when it responds to an increase in the acceleration, developing at the initial stage of the collision condition as indicated by point 0 in FIG. 29. The second acceleration responsive switch means 151, on the other hand, is adapted to be closed responsive to an acceleration greater than the predetermined degree G. A timing circuit 154 is connected to input and output terminals of the first acceleration responsive switch means 150. This timing circuit 154 is connected to normally closed switch means 155 which is connected between the first and second acceleration responsive switch means 150 and 151, respectively. This third switch means 155 is controlled by the timing circuit 154 in a manner to be opened when the time set on the circuit 154 has lapsed.

When a collision is initially encountered by the motor vehicle, then the first acceleration responsive switch means 150 is closed so that the timing circuit 154 becomes operative. If, in this condition, the acceleration resulting from the collision is greater than the predetermined degree G and if such acceleration is reached within the time interval which is set on the timing circuit 154, then the second acceleration switch means 151 is closed with the switch means 155 kept closed. The actuating means 153 is thus energized from the power source 152 so that the safety arrangement is actuated to the protective position. If, however, the acceleration greater than the predetermined degree G is reached upon lapse of time T, then the switch 155 is opened by the timing circuit 154 although the second acceleration responsive switch means 151 is kept closed. If, furthermore, the acceleration detected by the second acceleration responsive switch means 151 is smaller than the predetermined degree G, then the switch means 151 remains open although the switch means 155 may be in the closed position. In the latter two instances, the actuating means 153 is kept inoperative so that the safety arrangement is held at rest.

Figure 31:
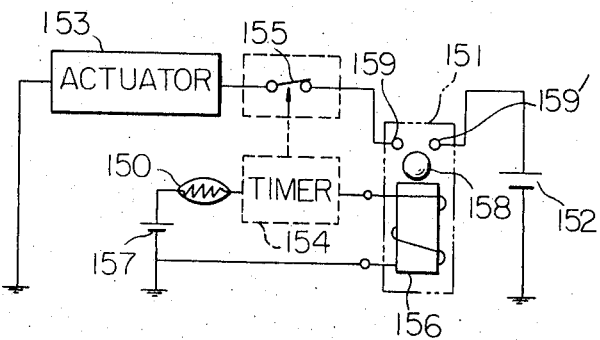
FIGS. 31 to 32 are views showing detailed circuit constructions of the collision detecting switch device shown in FIG. 30.
Figure 32:
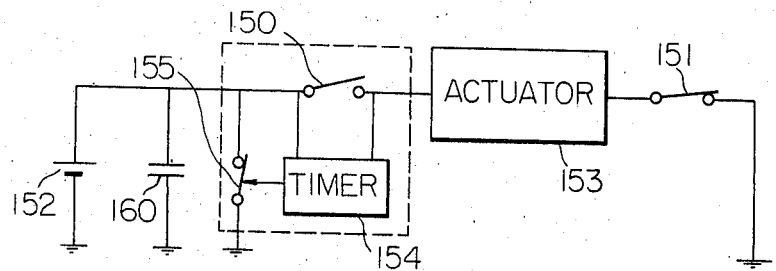

FIG. 31 illustrates an example of a practical form of the collision detecting switch device shown in FIG. 30. In this example, the first acceleration responsive switch means 150 is shown as constructed by any of the previously described mechanical pressure or collision detecting devices of the normally-conducting type which have been shown in any of FIGS. 2 to 13b. The second acceleration responsive switch means 151, on the other hand, is constructed as a so-called inertia switch comprising a solenoid 156 electrically connected to a power source 157 through the timing circuit 154 and first acceleration responsive switch means 150. A ball member 158 which is made of a magnetic material is in contact with the solenoid 156 which is the energized condition and is associated with spaced contacts 159 and 159' which are connected to the power source 152 and switch means 155. This ball member 158 has a considerable weight and acts as an inertial mass. The inertia switch 151 thus constructed operates, when subjected to acceleration greater than the predetermined degree G, in such a manner that the solenoid 156 is de-energized with the first acceleration responsive switch means 150 made non-conducting so as to cause the ball member 158 to be dislocated from the solenoid 156 to a position interconnecting the spaced contacts 159 and 159' to each other. The actuating means 153 of the safety arrangement is thus energized from the power source 152 provided the switch means 155 is kept closed.

Figure 33:
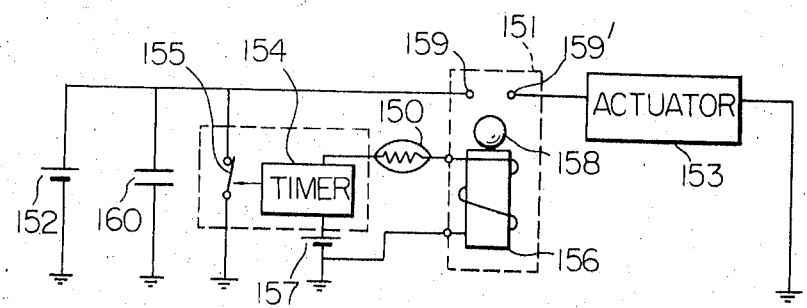

In order that the collision detecting switch device of the basic construction shown in FIG. 30 be capable of operating properly even in the event of a failure of the power source 152, a capacitor 160 may be connected between the power source 152 and acceleration responsive switch means 151 and switch means 155. This capacitor 160 operates to be discharged in the event of the failure of the power source. FIG. 33 shows a modification of the embodiment of FIG. 31 in which the capacitor 160 is interposed between the power source 152 and the second acceleration responsive switch means 151 and third switch means 155 for the same purpose as discussed above.

What is claimed is:

1. A mechanical pressure detecting device comprising electrically conductive means which is deformable by a mechanical pressure greater than predetermined magnitude which is applied to said detecting device to generate an electric signal, an insulating support element receiving therein said electrically conductive means and insulating the same, and a presser member shaped in the form of a plate and positioned to be in contact at an internal surface with an external surface of said insulating support element and directly receiving a mechanical pressure applied to said detecting device, said presser member being deformed when subjected to said mechanical pressure greater than said predetermined magnitude to deform said insulating support element thereby causing the deformation of said electrically conductive means and the generation of said electric signal.

2. A mechanical pressure detecting device according to claim 1, in which said electrically conductive means comprises a conductor which is severable when subjected to a mechanical pressure greater than said predetermined magnitude.

3. A mechanical pressure detecting device according to claim 1, in which said electrically conductive means comprises an electrically conductive rupturable member connected to leads of electric lines and rupturable when subjected to a mechanical pressure greater than said predetermined magnitude.

4. A mechanical pressure detecting device comprising electrically conductive means which is deformable by a mechanical pressure greater than a predetermined magnitude which is applied to said detecting device for generating an electric signal, an insulating support element receiving therein said electrically conductive means and insulating same, and a pressure member surrounding said insulating support element and directly receiving said mechanical pressure applied to said detecting device, said insulating support element being deformed by said presser member when said presser member receives a mechanical pressure greater than said predetermined magnitude thereby causing the deformation of said electrically conductive means and the generation of said electric signal, in which said electrically conductive means comprises an electrically conductive rupturable member connected to leads of electric lines and rupturable when subject to a mechanical pressure greater than said predetermined magnitude, in which said electrically conductive rupturable member is made up of a glass tube which is coated with an electrically conductive layer and which is connected to said leads at spaced points.

5. A mechanical pressure detecting device according to claim 4, in which said glass tube is coated on the outer surface thereof with said electrically conductive layer.

6. A mechanical pressure detecting device according to claim 4, in which said glass tube is coated on the inner surface thereof with said electrically conductive layer.

7. A mechanical pressure detecting device comprising electrically conductive means which is deformable by a mechanical pressure greater than a predetermined mangitude which is applied to said detecting device for generating an electric signal, an insulating support element receiving therein said electrically conductive means and insulating same, and a pressure member surrounding said insulating support element and directly receiving said mechanical pressure applied to said detecting device, said insulating support element being deformed by said pressure member when said pressure member receives a mechanical pressure greater than said predetermined magnitude thereby causing the deformation of said electrically conductive means and the generation of said electric signal, in which said electrically conductive means comprises an electrically conductive rupturable member connected to leads of electric lines and rupturable when subject to a mechanical pressure greater than said predetermined magnitude, in which said glass tube is internally maintained at a subatmospheric pressure.

* * * * *